Aug. 19, 1941.  J. TODD  2,252,904
CLIP DEVICE
Filed Oct. 3, 1939
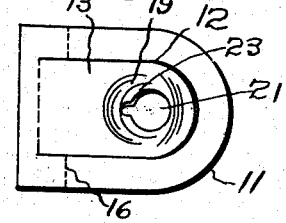
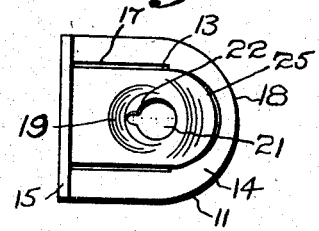
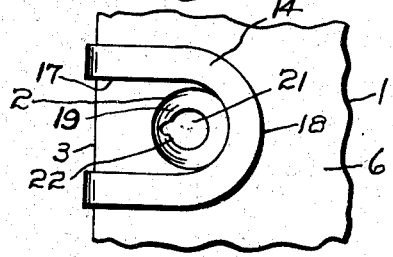
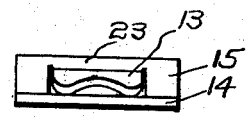
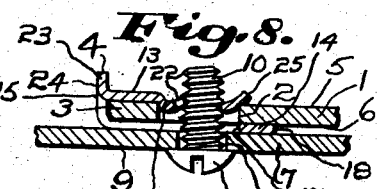
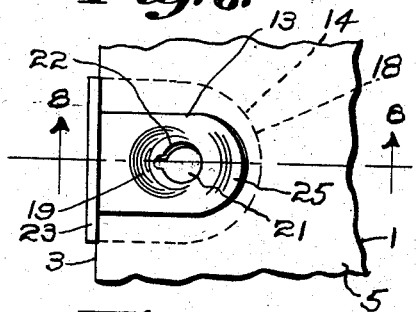
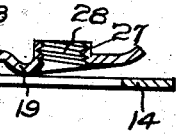
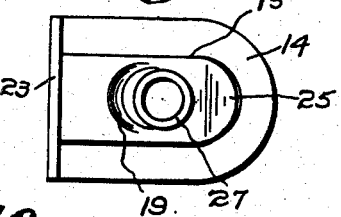
Inventor:
John Todd.
by Walter P. Jones
Att'y.

Patented Aug. 19, 1941

2,252,904

UNITED STATES PATENT OFFICE 2,252,904

CLIP DEVICE

John Todd, Lincoln, Mass., assignor to United-Carr Fastener Corporation, Cambridge, Mass., a corporation of Massachusetts Application October 3, 1939, Serial No. 297,687

2 Claims. (Cl. 85—32)

This invention relates to improvements in sheet metal nut members of the type adapted to be fixed in assembly with a supporting panel so as to enable a bolt to be threaded into engagement with the nut member entirely from a position opposite one face of the panel. My nut member is particularly useful in connection with so-called "blind assemblies" due to the fact that a bolt member may be threaded into engagement with the nut without the necessity of an operator holding the nut.

Referring to the drawing, in which I have illustrated preferred embodiments of my invention:

Fig. 1 is a top plan view of a nut blank showing dotted lines along which the blank is folded to form the finished product;

Fig. 2 is a side elevation of the blank shown in Fig. 1;

Fig. 3 is a top plan view of the completed nut member;

Fig. 4 is an end view of the completed nut member looking from the right of Fig. 3;

Fig. 5 is a side elevation of the completed nut member;

Fig. 6 is a top plan view showing my improved nut member assembled with a supporting panel;

Fig. 7 is a bottom plan view of the installation shown in Fig. 6;

Fig. 8 is a sectional view taken along the line 8—8 of Fig. 6 and showing the manner in which a bolt is engaged with the nut member to secure a plate member to the supporting panel;

Fig. 9 is a top plan view of a modified form of nut member; and

Fig. 10 is a longitudinal sectional view of the nut member shown in Fig. 9.

Referring to Fig. 8, in which I have illustrated a preferred use of my nut device, I have shown a supporting panel 1 having a circular opening 2 therein spaced from a marginal edge 3 of the panel. My improved nut member 4 is assembled with the panel 1 over the marginal edge 3 and provides means resiliently engaging opposed surfaces 5 and 6 of the panel 1 to maintain the nut member in proper relative position. A plate 7 is secured in superposed relation to the panel 1 through means of a bolt having a head portion 8 engaging an outer surface 9 of the plate member and a threaded shank 10 extending through the plate member 7 and panel 1 to engage with thread-engaging means provided by the nut member.

Referring in detail to my first form of nut member, its construction will be most clearly understood from inspection of Figs. 1 and 2, in which I have shown a blank of the nut member prior to bending the same to form the completed fastener. Thus in Fig. 1 I have shown a blank comprising the arm 11 (Fig. 1) having the slot 12 (Fig. 1) within its marginal edges which defines another arm 13. The arm 11 of the completed fastener comprises a panel-engaging portion 14 and an angularly extending portion 15 at one end of the panel-engaging portion formed by bending the blank transversely along the dotted line 16 of Fig. 1. The arm 13 is integrally joined to the angularly extending portion 15 and extends from the portion 15 in the completed fastener in the general direction of the panel-engaging portion 14. The arm 11 has an opening 17 therein extending from adjacent its outer end 18 into the portion 15, from which materials was taken to form the arm 13. The arm 13 and panel-engaging portion 14 are adapted to resiliently engage opposed surfaces 5 and 6 of the supporting panel between them to maintain the clip device in assembly with the supporting panel. For purposes of clarity in the specification and claims I have chosen to refer to the panel-engaging portions according to the relative position of the same shown in the drawing and thus the arm 13, which is formed from the arm 11, will be designated hereinafter as the upper panel-engaging portion and the portion 14 the lower panel-engaging portion.

The upper panel-engaging portion 13 has a depressed portion 19 deformed therefrom to engage within the opening 2 of the supporting panel 1 to center the clip in proper relative position for threaded engagement with the bolt. The depressed portion 19 preferably has an inclined surface 20 (Fig. 2) forming a cam to effect easy passage of the clip over the edge of the supporting panel when the clip is applied to the panel. It is understood that I do not wish to be limited by the particular shape of the depressed portion 19 as the depressed portion would be capable of satisfactory operation if formed round and of uniform depth. The panel-engaging portion 13 has an opening 21 with the wall surrounding the opening shaped to form a helix 22 of proper pitch for threaded engagement with the bolt shank 10. At least a portion of the helix 22 is formed from material within the margin of the depressed portion 19 with the result that the helix is aligned with the opening 2 of the supporting panel 1 after the depressed portion 19 has been moved into engagement with the opening 2. As a means for effecting easy application of the clip member to the supporting panel 1, the angularly extending portion 15 has a portion at its upper end in the form of a lip 23 which extends above the plane of the panel-engaging portion 13 and presents with the angularly extending portion 15 a smooth outer surface 24 adapted to be engaged by the finger of an operator during application of the clip to the panel. The outermost end 25 of the panel-engaging portion 13 may be turned upwardly so as to diverge from the panel-engaging portion 14 thereby providing a lead for quick engagement of the clip over the edge 3 of the supporting panel.

Assembly of the installation shown in Fig. 8 with the supporting panel may be quickly carried out through moving the clip member over the edge 3 of the panel as described to engage the depressed portion 19 within the opening 2 of the panel. Next the plate member 7 is moved into superposed relation to the outer surface 6 of the panel so as to present an opening 26 in alignment with the opening 2 of the panel. Finally the screw shank 10 is moved into the opening 26 and the opening 2 and turned into threaded engagement with the helix 22 to secure the plate member securely to the panel.

My modified form of clip member shown in Figs. 9 and 10 is similar to my preferred form, but instead of deforming the helix 22 from the depressed portion 19, as in my first form, I have chosen to draw a relatively short shank 27 from the support-engaging portion 13. The shank 27 is internally threaded as at 28 (Fig. 10). The shank 27 extends upwardly from the support-engaging portion 13 and a portion of the shank is formed from material of the depressed portion 19 whereby the threaded bore of the shank is centered in alignment with the opening 2 of the panel when the depressed portion 19 has been snapped into engagement with the opening 2.

Although I have illustrated and described preferred embodiments of my invention, I do not wish to be limited thereby because the scope of my invention is best defined by the following claims.

I claim:

1. A fastener clip for attachment to a supporting panel having an aperture for receiving a threaded member, said clip comprising a pair of arms having portions extending in the same general direction for engaging opposed surfaces of said supporting panel, a depressed portion deformed from the material of one of said panel-engaging portions to engage in the aperture of the panel for maintaining the clip in proper relative position to the panel, and said last-mentioned panel-engaging portion having a thread-engaging means formed as an integral part thereof, and at least a portion of said thread-engaging means being formed from material within the margin of said depressed portion.

2. A fastener clip comprising a pair of arms having portions extending in the same general direction for engaging opposed surfaces of an apertured supporting panel, one of said panel-engaging portions having a depressed portion formed from the material thereof to engage in the aperture of the panel for maintaining the clip in proper relative position to the panel, and said last-mentioned panel-engaging portion having a hollow shank drawn therefrom, said shank being internally threaded and at least a portion of said shank being formed from material within the margin of said depressed portion.

JOHN TODD.